(12) United States Patent
Kikuchi et al.

(10) Patent No.: US 7,816,912 B2
(45) Date of Patent: Oct. 19, 2010

(54) ANGLE DETECTOR INCLUDING DISTINCT MAGNETIC STATOR PORTIONS

(75) Inventors: Yoshimi Kikuchi, Nagano (JP); Kanji Kitazawa, Nagano (JP); Hisashi Mimura, Nagano (JP)

(73) Assignee: Tamagawa Seiki Kabushiki Kaisha, Nagano (JP)

( * ) Notice: Subject to any disclaimer, the term of this patent is extended or adjusted under 35 U.S.C. 154(b) by 439 days.

(21) Appl. No.: 11/921,148

(22) PCT Filed: Apr. 16, 2007

(86) PCT No.: PCT/JP2007/058263
§ 371 (c)(1),
(2), (4) Date: Nov. 28, 2007

(87) PCT Pub. No.: WO2008/004372
PCT Pub. Date: Jan. 10, 2008

(65) Prior Publication Data
US 2009/0033320 A1 Feb. 5, 2009

(30) Foreign Application Priority Data
Jul. 5, 2006 (JP) ............................. 2006-185414

(51) Int. Cl.
*G01B 7/30* (2006.01)
(52) U.S. Cl. .............................. 324/207.25; 310/68 B; 310/168
(58) Field of Classification Search ................. 318/661; 324/207.25; 310/68 B, 168, 49.29, 156.35, 310/254.1
See application file for complete search history.

(56) References Cited

U.S. PATENT DOCUMENTS

| 5,920,135 A | 7/1999 | Ohshita |
| 6,724,109 B2 * | 4/2004 | Mimura ........................ 310/71 |
| 6,936,949 B2 * | 8/2005 | Akutsu et al. .......... 310/216.074 |

FOREIGN PATENT DOCUMENTS

| JP | 8-136211 | | 5/1996 |
| JP | 2000292120 A | * | 10/2000 |
| JP | 2001-141516 | | 5/2001 |
| JP | 2001-165706 | | 6/2001 |
| JP | 2006284255 A | * | 10/2006 |
| WO | 01/42743 | | 6/2001 |

OTHER PUBLICATIONS

English machine translation of the claims and detailed description of JP 2006-284255 A, 9 pages, Apr. 6, 2010.*
International Search Report issued May 15, 2007 in the International (PCT) Application of which the present application is the U.S. National Stage.

* cited by examiner

*Primary Examiner*—Patrick J Assouad
*Assistant Examiner*—David M. Schindler
(74) *Attorney, Agent, or Firm*—Wenderoth, Lind & Ponack L.L.P.

(57) ABSTRACT

An angle detector includes a magnetic rotor and a plurality of magnetic stator portions. The magnetic stator portions are arranged separately in an annular stator frame and each magnetic stator portion includes a pair of magnetic stator strips. The periphery of the magnetic rotor is disposed between the magnetic stator strips of each magnetic stator portion. By such a configuration, accurate angle detection can be carried out irrespective of the decentering of a rotary shaft.

12 Claims, 5 Drawing Sheets

ANGLE DETECTOR INCLUDING DISTINCT MAGNETIC STATOR PORTIONS

BACKGROUND OF THE INVENTION (1) Field of the Invention

The present invention relates to an angle detector, and more particularly, to a new improvement made to eliminate the influence of gap fluctuations resulting from the vibrations of a rotary shaft by interposing a magnetic rotor in each of the magnetic stator portions having a U-shaped cross-section which is formed of a pair of magnetic stator strips and a magnetic connection body, and to eliminate the influence of magnetic field distribution resulting from mechanical positions of magnetic rotor poles by disposing the respective magnetic stator portions of a stator separately.

(2) Description of Related Art

As this kind of conventionally used thin type resolver, a construction using a rotary transformer shown in FIGS. 4 and 5, and a construction of a variable reluctance-type resolver of Patent Document 1 shown in FIG. 6 can be mentioned.

That is, within a casing 1 of the conventional construction shown in FIGS. 4 and 5, a resolver portion 2 and a rotary transformer portion 3 are superposed on each other along an axial direction.

A resolver portion 2 of the other conventional construction shown in FIG. 6 is comprised of an annular stator 5 having resolver stator coils 4, and an annular rotor 6 having no coil and rotatably provided within the stator 5.

Windings of the aforementioned resolver shown in FIGS. 4, 5, and 6 are shown in FIG. 8. As shown in FIG. 8, excitation windings R1 and R2 are monophasic, and output windings S1 to S4 of a detection side are biphasic.

Further, output voltage curves and output voltage equations obtained from the respective output windings S1 to S4 are shown in FIG. 7.

Patent Document 1: U.S. Pat. No. 5,920,135

BRIEF SUMMARY OF THE INVENTION

Problems to be Solved by the Invention

The conventional thin type resolvers are constructed as described above, and hence have the following problems.

That is, in the conventional construction disclosed in FIGS. 4 and 5, since the resolver portion and the rotary transformer portion are superposed on each other in the axial direction, the resolver itself become thick (minimum thickness is 16 mm). As a result, it is extremely difficult to further flatten the resolver.

In the other conventional construction of FIG. 6, only the resolver stator coils are required as the coils. However, since the resolver stator coils which are wound around the stator protrude from both surfaces of the stator, an insulating cover for insulating this resolver stator coils, a coil cover, and the like are required. As a result, those components mounting on the stator lead to an increase in thickness (minimum thickness is 10 mm), as in the foregoing case, it is extremely difficult to flatten the resolver. Further, since the rotor has no coils, the detection accuracy have limit.

In this conventional constructions, detection of rotation is carried out based on a change in permeance of a gap between the outer periphery of the rotor and the inner periphery of each magnetic pole of the stator, so the occurrence of vibrations of a rotary shaft has an influence on gap fluctuations.

The stator has an integral construction, so the distribution of a magnetic field generated by the excitation windings is affected by mechanical positions of rotor poles serving for detection.

Means for Solving the Problems

An angle detector according to the present invention includes: a plurality of magnetic stator portions installed separately at constant or various intervals in a circumferential direction of an annular stator frame made of an insulating member and each including a pair of magnetic stator strips; magnetic connection bodies each connecting the pair of magnetic stator strips to each other with a distance therebetween; annular excitation windings and annular detection windings that are provided along lateral portions of the magnetic connection bodies, respectively; and a magnetic rotor having a plate shape, which is provided inside the annular stator frame, decentered or changed at constant intervals in a radial direction, and has a peripheral edge thereof located rotatably between the pair of magnetic stator strips, and has a structure in which the pair of magnetic stator strips and corresponding ones of the magnetic connection bodies are connected having a U-shaped cross-section.

Further, the angle detector of the present invention has another structure in which each of the annular excitation windings and corresponding ones of the annular detection windings have parts, respectively, which are located outward of outer edges of the pair of magnetic stator strips.

Still further, the angle detector of the present invention has another structure in which the annular stator frame is constituted of a pair of annular stator frame strips and has a U-shaped cross-section; the plurality of magnetic stator portions are interposed in a stator frame gap between the pair of annular stator frame strips; and the peripheral edge of the magnetic rotor is located in the stator frame gap.

Yet further, the angle detector of the present invention has another structure in which each of the annular excitation windings and corresponding ones of the annular detection winding are superposed on each other along an axial direction of the magnetic rotor.

Effects of the Invention

The angle detector according to the present invention is constructed as described above and hence makes it possible to obtain the following effects.

The peripheral edge of the plate-like magnetic rotor moves into and out of the gap between the pair of the magnetic stator strips that are connected by the magnetic connection body in U shape, so the gap viewed from the stator side is mechanically constant even in a case where vibrations of a rotary shaft occur. As a result, detection of an angle can be carried out stably and accurately without being affected by the vibrations of the rotary shaft.

The respective magnetic stator portions constituting the stator are not integral but separate and independent of one another, so the distortion of excitation magnetic field distribution resulting from mechanical positions of other magnetic rotor poles can be eliminated. As a result, detection of an angle can be carried out more accurately in a space smaller than before.

DETAILED DESCRIPTION OF THE INVENTION

It is an object of the present invention to provide an angle detector designed to eliminate the influence of gap fluctuations resulting from the vibrations of a rotary shaft by interposing a magnetic rotor in each of the magnetic stator portions having a U-shaped cross-section which is formed of a pair of magnetic stator strips and a magnetic connection body, and to eliminate the influence of magnetic field distribution resulting from mechanical positions of magnetic rotor poles by disposing the respective magnetic stator portions of a stator separately.

Embodiment

A preferred embodiment of an angle detector according to the present invention will be described hereinafter with reference to the drawings. The following description will be given with the same reference symbols assigned to components identical or corresponding to those of the conventional examples.

Figure 1:
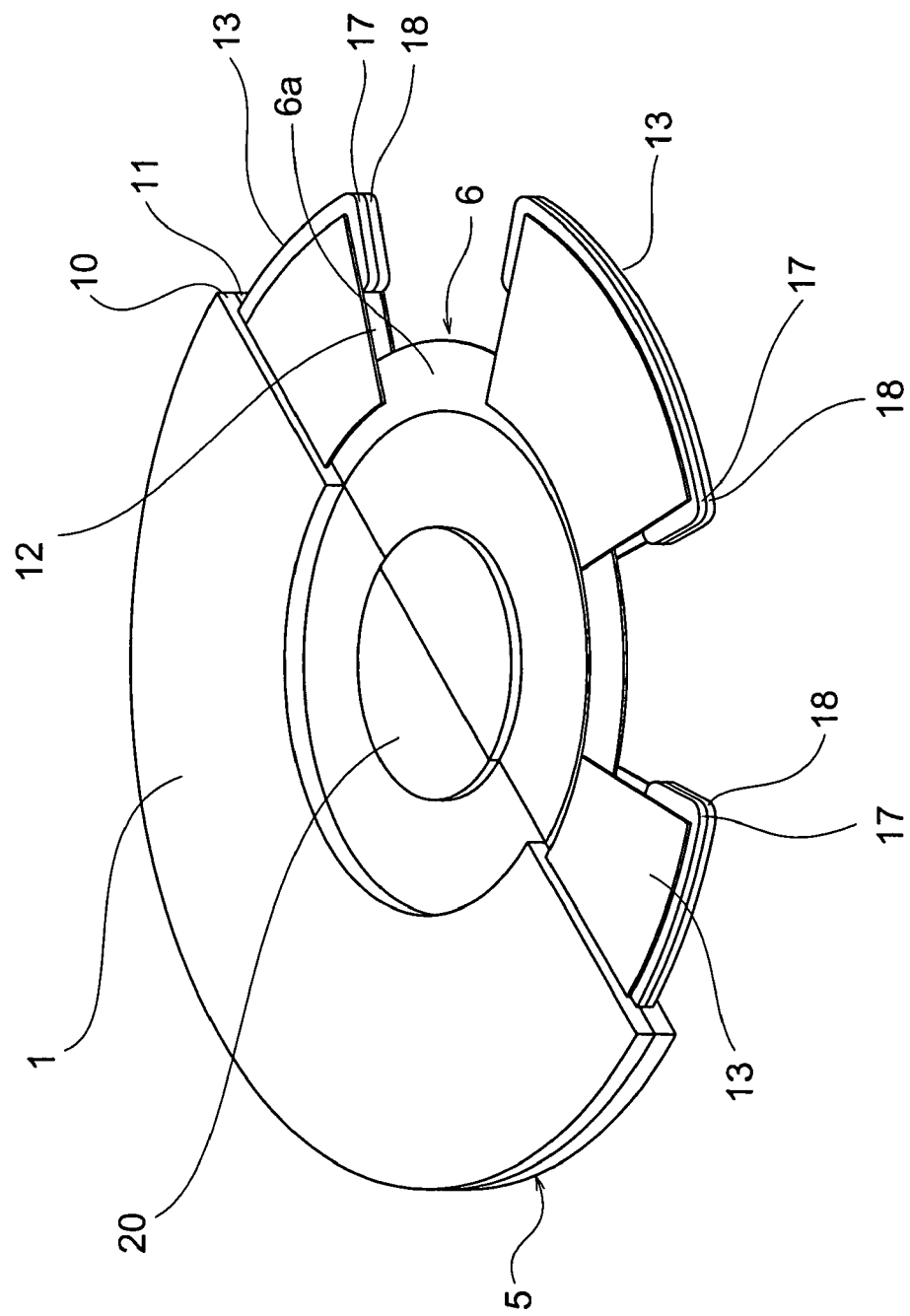
FIG. 1 is a partially cutaway perspective view showing an angle detector according to the present invention.

Referring to FIG. 1, an annular stator frame as a casing denoted by a reference symbol 1 is made of an insulating member and composed of a pair of annular stator frame strips 10 and 11. In this annular stator frame 1, an annular stator frame gap 12 is formed.

A plurality of magnetic stator portions 13, which are arranged separately in a circumferential direction of the stator frame gap 12 at constant or various intervals and independently of one another, are disposed in the stator frame gap 12.

Figure 2:
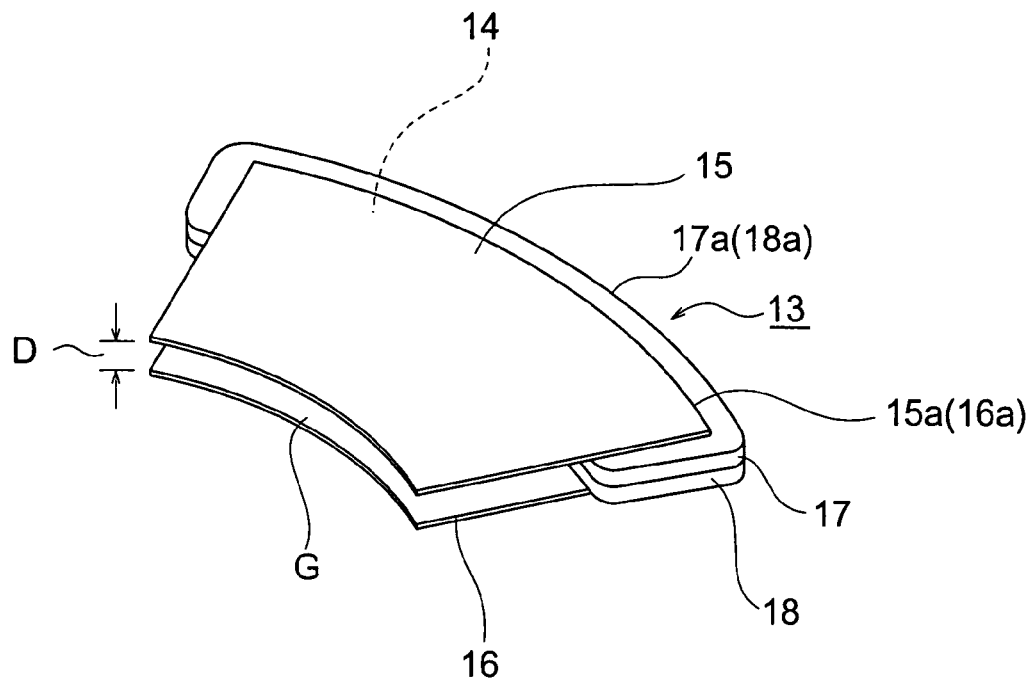
FIG. 2 is an enlarged perspective view showing a magnetic stator portion of FIG. 1.
Figure 3:
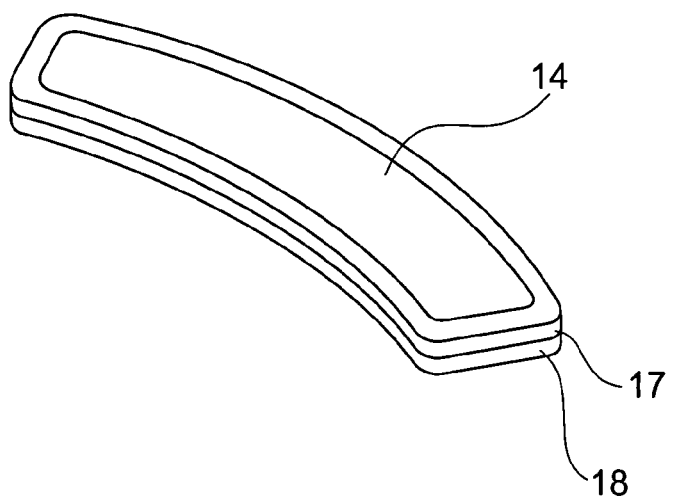
FIG. 3 is a perspective view showing a magnetic connection body of FIG. 2.
Figure 4:
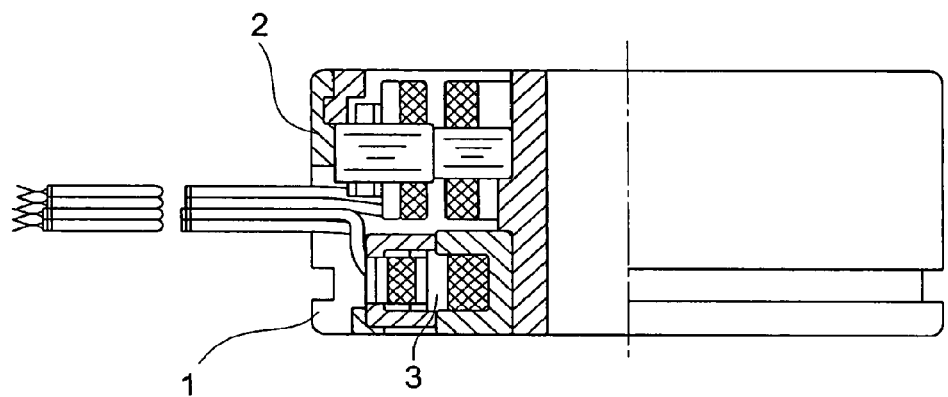
FIG. 4 is a half-sectional view showing a conventional resolver.
Figure 5:
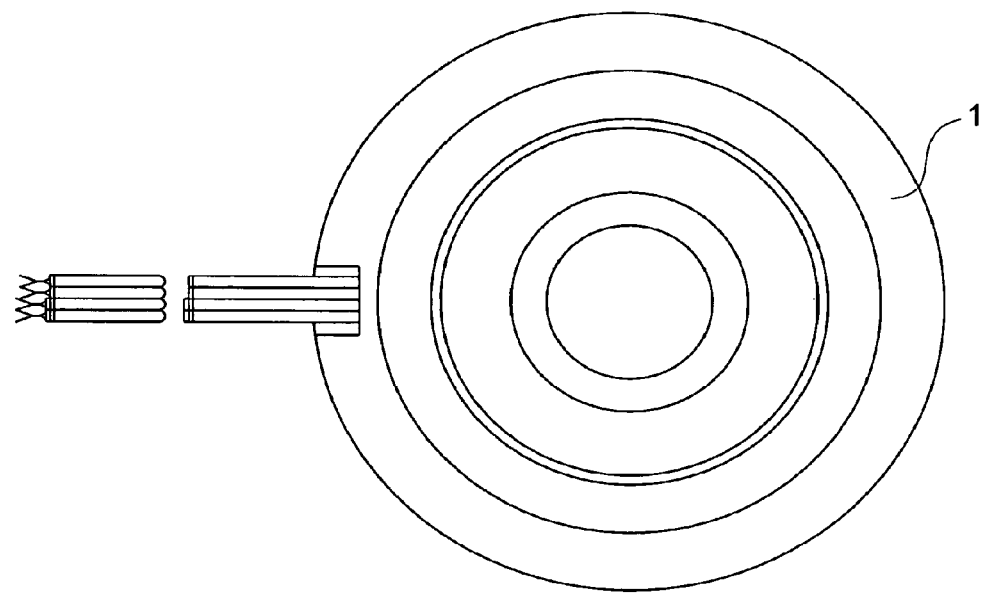
FIG. 5 is a plan view of FIG. 4.
Figure 6:
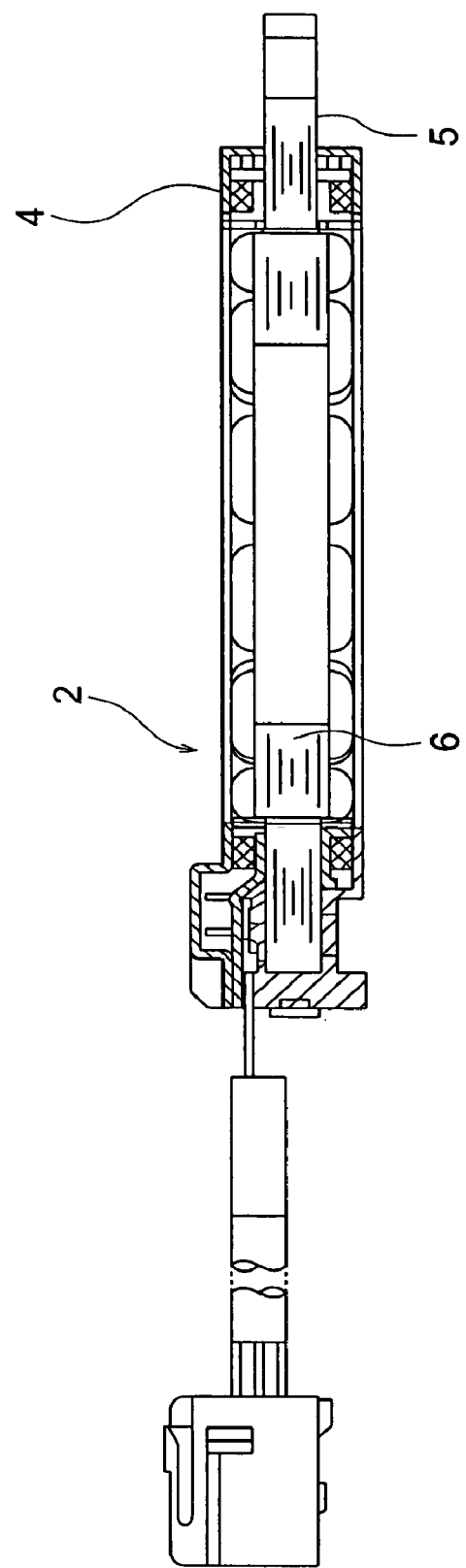
FIG. 6 is a sectional view of a conventional VR-type resolver.
Figure 7:
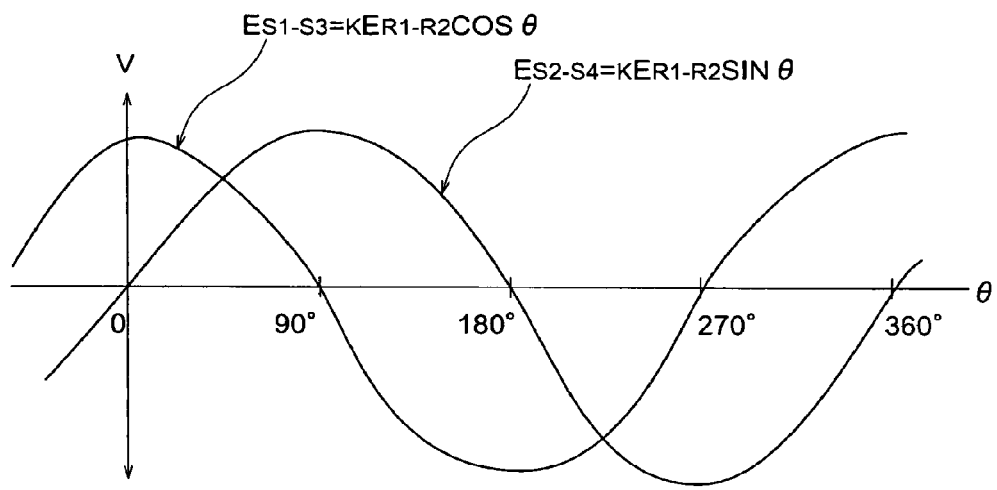
FIG. 7 shows output voltage curves and output voltage equations of the resolver.
Figure 8:
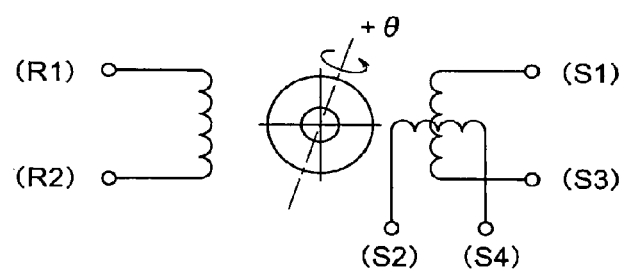
FIG. 8 is a wiring diagram showing a wire connection of the resolver.

The respective magnetic stator portions 13 and the annular stator frame 1 constitute a stator 5. As shown particularly in FIG. 2, each of the magnetic stator portions 13 is composed of a pair of magnetic stator strips 15 and 16 connected to both surfaces of an arcuate, plate-like magnetic connection body 14 shown in FIG. 3, and an annular excitation winding 17 and an annular detection winding 18 that are provided along a lateral portion of the magnetic connection body 14. Parts 17a and 18a of the respective windings 17 and 18 are located outward of outer edges 15a and 16a of the respective magnetic stator strips 15 and 16. In addition, in superposing the respective windings 17 and 18 on each other, it does not matter which of the windings 17 and 18 is located on the upper side or on the lower side.

The respective magnetic stator strips 15 and 16 forms therebetween a gap G resulting from a distance D corresponding to the thickness of the magnetic connection body 14, thereby forming a U-shaped cross-section.

The annular excitation winding 17 and the annular detection winding 18 are superposed on each other along an axial direction of a rotary shaft 20 located inward of the stator 5. In addition, the gap G is fixed by the pair of stator strips 15 and 16 to maintain magnetic accuracy and prevent creation of an error.

The annular stator frame 1 has a U-shaped cross-section in a radial direction thereof, and the respective magnetic stator portions 13 are disposed as described above in the stator frame gap 12 formed between the annular stator frame strips 10 and 11.

A circular disc-shaped magnetic rotor 6, which is held by the rotary shaft 20 located at a decentered position, is rotatably provided inside the annular stator frame 1. A peripheral edge 6a of the magnetic rotor 6 is located in the stator frame gap 12 while overlapping with a part of the respective magnetic stator portions 13. This peripheral edge 6a is designed to move into and out of the gap G of each of the magnetic stator portions 13 due to rotation of the rotary shaft 20.

In a case where the rotary shaft 20 is not decentered, the peripheral edge 6a of the magnetic rotor 6 assumes such a shape as changes in size at constant intervals in the radial direction thereof, for example, a shape having one or a plurality of mountainous portions such as a known heart shape, a known trefoil shape, or a known quatrefoil shape. As the magnetic rotor 6 rotates, the area thereof overlapping with the pair of the magnetic stator strips 15 and 16 changes, so a resolver signal made of an induced voltage can be obtained in the annular detection winding 18.

Accordingly, the magnetic rotor 6 constitutes a known variable reluctance-type (VR-type) resolver having no winding.

Thus, according to the construction of the present invention, the gap G is fixed even if vibrations of the shaft occur as in the conventional construction, so detection of an angle can be carried out accurately.

Angular information obtained in the course of rotation of the magnetic rotor 6 depends on the amount of the overlapping of the pair of the stator strips 15 and 16 and the rotor 6, so an error can be prevented from being created through vibrations of the rotary shaft 20.

In the stator 5, the respective magnetic stator portions 13 are electrically integrated with one another but are disposed separately to be magnetically separated from one another, so an effect of shutting off a detection signal component from another rotor, which is opposed to the respective magnetic stator portions 13, is obtained. As a result, an improvement in detection accuracy can be achieved.

The invention claimed is:

1. An angle detector, comprising:
an annular stator frame made of an insulating member;
a plurality of magnetic stator portions installed separately at constant or various intervals in a circumferential direction of the annular stator frame, each magnetic stator portion including a pair of magnetic stator strips and a magnetic connection body, the magnetic connection body connecting the magnetic stator strips to each other with a distance provided between the magnetic stator strips such that the magnetic stator portion has a U-shaped cross-section;
excitation windings provided along lateral portions of the magnetic connection bodies, respectively;
detection windings provided along lateral portions of the magnetic connection bodies, respectively; and
a magnetic rotor having a plate shape, the magnetic rotor being provided inside the annular stator frame and having a peripheral edge thereof rotatably disposed between the magnetic stator strips of each magnetic stator portion.

2. An angle detector according to claim 1, wherein the magnetic rotor is decentered.

3. An angle detector according to claim 2, wherein each of the excitation windings and each of the detection windings have parts located radially outwardly of outer edges of the magnetic stator strips.

4. An angle detector according to claim 3, wherein:
the annular stator frame is formed of a pair of annular stator frame strips and has a U-shaped cross-section;
the magnetic stator portions are interposed in a stator frame gap between the pair of annular stator frame strips; and
the peripheral edge of the magnetic rotor is located in the stator frame gap.

5. An angle detector according to claim 4, wherein the excitation windings are superposed on the detection windings, respectively, in an axial direction of the magnetic rotor.

6. An angle detector according to claim 1, wherein each of the excitation windings and each of the detection windings have parts located radially outwardly of outer edges of the magnetic stator strips.

7. An angle detector according to claim 6, wherein:
the annular stator frame is formed of a pair of annular stator frame strips and has a U-shaped cross-section;
the magnetic stator portions are interposed in a stator frame gap between the pair of annular stator frame strips; and
the peripheral edge of the magnetic rotor is located in the stator frame gap.

8. An angle detector according to claim 7, wherein the excitation windings are superposed on the detection windings, respectively, in an axial direction of the magnetic rotor.

9. An angle detector according to claim 1, wherein:
the annular stator frame is formed of a pair of annular stator frame strips and has a U-shaped cross-section;
the magnetic stator portions are interposed in a stator frame gap between the pair of annular stator frame strips; and
the peripheral edge of the magnetic rotor is located in the stator frame gap.

10. An angle detector according to claim 9, wherein the excitation windings are superposed on the detection windings, respectively, in an axial direction of the magnetic rotor.

11. An angle detector according to claim 1, wherein the excitation windings are superposed on the detection windings, respectively, in an axial direction of the magnetic rotor.

12. An angle detector according to claim 1, further comprising a rotary shaft, wherein the magnetic rotor is held by the rotary shaft located at a decentered position.

* * * * *